(12) United States Patent
Badawy et al.

(10) Patent No.: US 10,386,447 B2
(45) Date of Patent: Aug. 20, 2019

(54) METHOD AND APPARATUS FOR SIMPLE ANGLE OF ARRIVAL ESTIMATION

(71) Applicant: QATAR FOUNDATION FOR EDUCATION, SCIENCE AND COMMUNITY DEVELOPMENT, Doha (QA)

(72) Inventors: Ahmed Badawy, Doha (QA); Tamer Khattab, Doha (QA); Daniele Trinchero, Verrua Savoia (IT); Tarek Elfouly, Doha (QA); Amr Mohamed, Doha (QA)

(73) Assignee: Qatar University, Doha (QA)

( * ) Notice: Subject to any disclaimer, the term of this patent is extended or adjusted under 35 U.S.C. 154(b) by 252 days.

(21) Appl. No.: 15/268,371

(22) Filed: Sep. 16, 2016

(65) Prior Publication Data

US 2017/0074962 A1    Mar. 16, 2017

Related U.S. Application Data

(60) Provisional application No. 62/219,617, filed on Sep. 16, 2015.

(51) Int. Cl.
G01S 3/38    (2006.01)
G01S 3/06    (2006.01)

(52) U.S. Cl.
CPC .............. G01S 3/38 (2013.01); G01S 3/065 (2013.01)

(58) Field of Classification Search
CPC .............. G01S 3/38; G01S 3/40; G01S 3/065

USPC ........ 342/378, 423, 442, 443, 445; 375/316, 375/322

See application file for complete search history.

(56) References Cited

U.S. PATENT DOCUMENTS

| | | | |
|---|---|---|---|
| 6,411,257 B1 | 6/2002 | Sorelius et al. |
| 6,922,450 B2 | 7/2005 | Yuda et al. |
| 8,116,350 B1 | 2/2012 | Arndt et al. |
| 8,797,213 B2 | 8/2014 | Pun et al. |
| 9,097,791 B2 | 8/2015 | Kishigami et al. |
| 2012/0258729 A1 | 10/2012 | Siomina et al. |

OTHER PUBLICATIONS

Dmochowski, Jacek, Jacob Benesty, and Sofiene Affes. "Direction of arrival estimation using the parameterized spatial correlation matrix," Audio, Speech, and Language Processing, IEEE Transactions on 15.4 (2007): 1327-1339.

(Continued)

*Primary Examiner* — Dao L Phan
(74) *Attorney, Agent, or Firm* — Richard C. Litman

(57) ABSTRACT

The method and apparatus for angle of arrival estimation are used for estimating the angle of arrival of a received signal by a switched beam antenna array and a single receiver. The switched beam antenna array first collects an omnidirectional signal to be used as a reference signal. A main beam thereof is then switched to scan an angular region of interest. The collected signals from the switched beams are cross-correlated with the reference signal. The cross-correlation coefficient is the highest at the true angle of arrival and relatively negligible otherwise. The collected signal from each beam angle is cross-correlated with the omnidirectional reference signal to determine the angle of arrival of the received signal.

3 Claims, 13 Drawing Sheets

(56) References Cited

OTHER PUBLICATIONS

Dmochowski, Jacek, Jacob Benesty, and Sofiene Affes. "Direction of arrival estimation using eigenanalysis of the parameterized spatial correlation matrix," Acoustics, Speech and Signal Processing, 2007. ICASSP 2007. IEEE International Conference on. vol. 1. IEEE, 2007.
Badawy, Ahmed, et al. "A Simple Angle of Arrival Estimation Scheme," arXiv preprint arXiv:1409.5744, Sep. 19, 2014.
Badawy, Ahmed, et al. "Secret Key Generation Based on AoA Estimation for Low SNR Conditions," arXiv preprint arXiv:1411.2208 (2014).

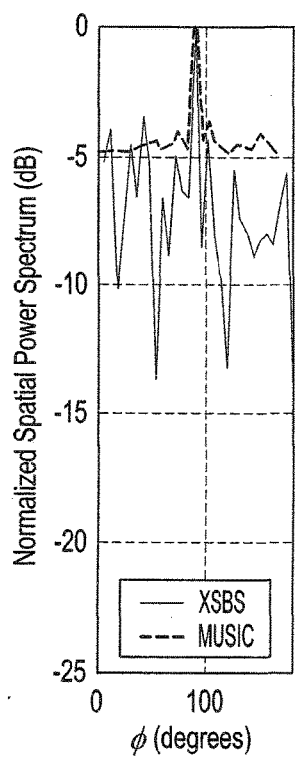
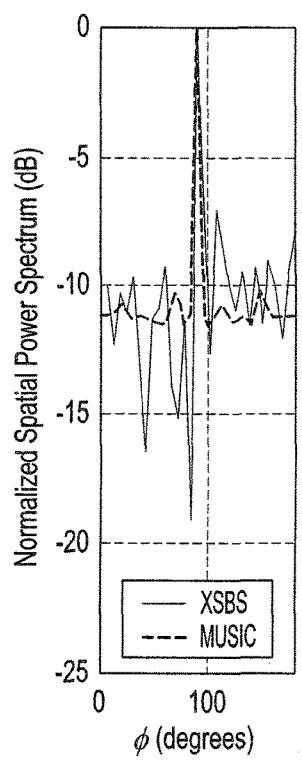
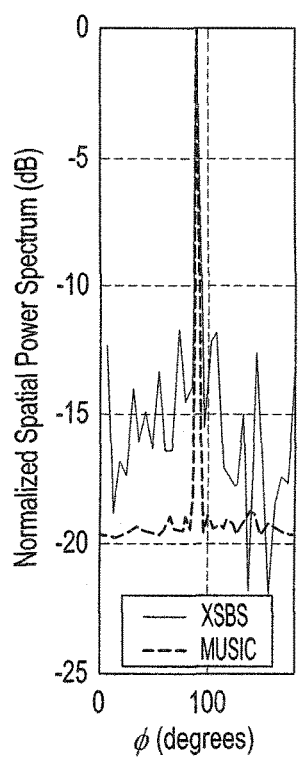
FIG. 7A  FIG. 7B  FIG. 7C

METHOD AND APPARATUS FOR SIMPLE ANGLE OF ARRIVAL ESTIMATION

CROSS-REFERENCE TO RELATED APPLICATION

This application claims the benefit of U.S. Provisional Patent Application Ser. No. 62/219,617, filed on Sep. 16, 2015.

BACKGROUND OF THE INVENTION

1. Field of the Invention

The present invention relates to angle of arrival estimation for signals, and particularly to a system and method utilizing cross correlation for estimating the angle of arrival of a received signal by a switched beam antenna array.

2. Description of the Related Art

An adaptive array system (AAS) can steer a beam in any desired direction by setting the weights across the antenna array elements. AAS requires M receivers to estimate the angle of arrival (AoA), where M is the number of antenna elements in the array. The AoA estimation techniques that use AAS can operate at lower signal-to-noise ratios (SNRs) than the conventional switched beam system (SBS) technique, but has greater hardware and computational complexities.

The switched beam system (SBS) uses a fixed number of beams to scan the azimuth plane. The AoA is the angle of the beam with the highest received power or signal strength (RSS). The SBS is easy to implement since it requires a single receiver and no baseband signal processing technique is needed to estimate the AoA. In other words, the hardware and computational complexities of SBSs are low. However, if the power of the received signal is lower than the receiver sensitivity; i.e., at low signal to noise ratio (SNR), SBS will fail to estimate the AoA.

AoA estimation techniques that use AAS can be divided into two main groups: so-called "classical" techniques and subspace techniques. The classical AoA techniques are Delay and Sum, also known as the Bartlett technique, and Minimum Variance Distortionless (MVDR), also known as the Capon technique. By steering the beams electronically and estimating the power spectrum of the received signal, the AoAs are estimated as being the peaks in the spatial power spectrum. The main drawback of the Bartlett technique is that signal impinging with an angular separation less than $$\frac{2\pi}{M}$$

cannot be resolved. The Capon technique relatively solves the angular resolution drawback of the Bartlett method at the cost of more baseband processing needed for matrix inversion.

The subspace techniques are based on the concept that the signal subspace is orthogonal to the noise subspace. The most widely used technique in this group is the MUltiple SIgnal Classification (MUSIC) technique. The MUSIC technique provides the highest angular resolution and can operate at low SNR levels. This comes at the cost that it requires a full a priori knowledge of the number of sources and the array response, whether it is measured and stored or computed analytically. The signal and noise subspaces are distinguished through an eigen-decomposition operation applied at the covariance matrix of the received signal. This operation requires a substantial computational complexity.

Thus, a method and apparatus for angle of arrival estimation addressing the aforementioned problems is desired.

SUMMARY OF THE INVENTION

The method and apparatus for a simple angle of arrival estimation are used for estimating the angle of arrival of a received signal by a switched beam antenna array. The switched beam antenna array first collects an omnidirectional signal to be used as a reference signal. A main beam thereof is then switched to scan an angular region of interest. The collected signals from the switched beams are cross-correlated with the reference signal to determine the angle of arrival of the received signal. The cross-correlation coefficient is the highest at the true angle of arrival and relatively negligible otherwise.

For the example of a uniform linear array with uniform excitation, the method for simple angle of arrival estimation includes the following steps: (a) receiving an omnidirectional signal with a subset of antenna elements of a switched beam antenna array, where the switched beam antenna array has M total antenna elements, and during reception of the omnidirectional signal, a remainder of the antenna elements are switched off by RF switches; (b) dividing an angular space of interest into K beams; (c) setting an integer k equal to 1; (d) calculating a k-th steering vector, $a_k(\phi_k)$, which points to a k-th azimuth angle, $\phi_k$, for the switched beam antenna array as $a_k(\phi_k)=[1, e^{\beta d \cos \phi_k}, e^{\beta d \cos \phi_k}, \ldots, e^{\beta(M-1)d \cos \phi_k}]$, where $$\beta = \frac{2\pi}{\lambda}, \lambda$$

is a wavelength of a signal s(t) received by the switched beam antenna array, and d is a separation distance between adjacent ones of the antenna elements, and where the switched beam antenna array is a uniform linear antenna array; (e) calculating a k-th weight vector, $w_k$, where, for uniform excitation, the k-th weight vector is calculated as $w_k=a_k(\phi_k)$, and for non-uniform Dolph-Chebyshev excitation, the k-th weight vector is calculated as $w_k=a_c e^{j\psi_k}$, where $\psi_k=\beta d \cos \phi_k$ and $a_c$ are coefficients of dimensions 1×M of an inverse z-transform of an array factor, A(Z), where $A(Z)=Z^{-(M-1)/2}\prod_{i=1}^{M-1}(Z-Z_i)$, where $Z_i=2e^{j\varphi_i}$ and $$\varphi_i = 2\cos^{-1}\left(\frac{y_i}{y_0}\right),$$

where $$\gamma_i = \cos\left(\frac{(i-1/2)\pi}{M-1}\right)$$

for i=1, 2, . . . , M−1 and $$y_0 = \cosh\left(\frac{\cosh^{-1}(R)}{M-1}\right),$$

where R is a main lobe to side lobe ratio and j represents the imaginary number; (f) if k<K, then setting k=k+1 and returning to step (d); (g) feeding the set of weights $w_k$ for all k=1, . . . , K to attenuators and phase shifters of the switched beam antenna array such that a main beam thereof is directed toward the k-th azimuth angle; (h) collecting a k-th received signal component, $x_k(n)$, from a direction of the k-th azimuth angle $\phi_k$ for a sample n of N total samples as $x_k(n)=\Sigma_M w_k s(n)+v(n)$, where v(n) is additive white Gaussian noise; (i) calculating a cross-correlation coefficient, $R_{k0}$, between an n-th sample of a reference signal, $x_0(n)$, and the k-th received signal component, $x_k(n)$, as $$R_{k0} = \frac{1}{N} \sum_{n=1}^{N} x_k(n) x_0^H(n),$$

where $x_0^H(n)$ is a Hermitian of the reference signal $x_0(n)$, the received omnidirectional signal being the reference signal; and (j) calculating an angle of arrival as an azimuth angle, $\phi_{k^*}$, where $k^* = \text{argmax}_k(R_{k0})$. As noted, the above is given for the example of a uniform linear array (ULA) with uniform excitation. It should be understood that the generalized method may be used with an arbitrary antenna array shape. For example, for a uniform circular array (UCA), the same method is applied, but, $a(\phi)=[e^{\beta r \cos(\phi-\phi_1)}, e^{\beta r \cos(\phi-\phi_2)}, \ldots, e^{\beta r \cos(\phi-\phi_M)}]$, where $$\phi_M = \frac{2\pi m}{M}, m = 1, 2, \ldots, M,$$

and $\phi$ ranges between [0:2π]. Here, r is the radius of the antenna array.

These and other features of the present invention will become readily apparent upon further review of the following specification and drawings.

BRIEF DESCRIPTION OF THE DRAWINGS

FIG. 7A is a graph comparing the normalized spatial power spectrum of the method for simple angle of arrival estimation against the prior art MUSIC technique for SNR=−20 dB.

FIG. 7B is a graph comparing the normalized spatial power spectrum of the method for simple angle of arrival estimation against the prior art MUSIC technique for SNR=−15 dB.

FIG. 7C is a graph comparing the normalized spatial power spectrum of the method for simple angle of arrival estimation against the prior art MUSIC technique for SNR=−10 dB.

Unless otherwise indicated, similar reference characters denote corresponding features consistently throughout the attached drawings.

DETAILED DESCRIPTION OF THE PREFERRED EMBODIMENTS

A method and apparatus for simple angle of arrival estimation are used for estimating the angle of arrival of a received signal by a switched beam antenna array. The switched beam antenna array first collects an omnidirectional signal to be used as a reference signal. A main beam thereof is then switched to scan an angular region of interest. The collected signals from the switched beams are cross-correlated with the reference signal. The cross-correlation coefficient is the highest at the true angle of arrival and relatively negligible otherwise. The collected signal from each beam angle is cross-correlated with the omnidirectional reference signal to determine the angle of arrival of the received signal.

Figure 1:
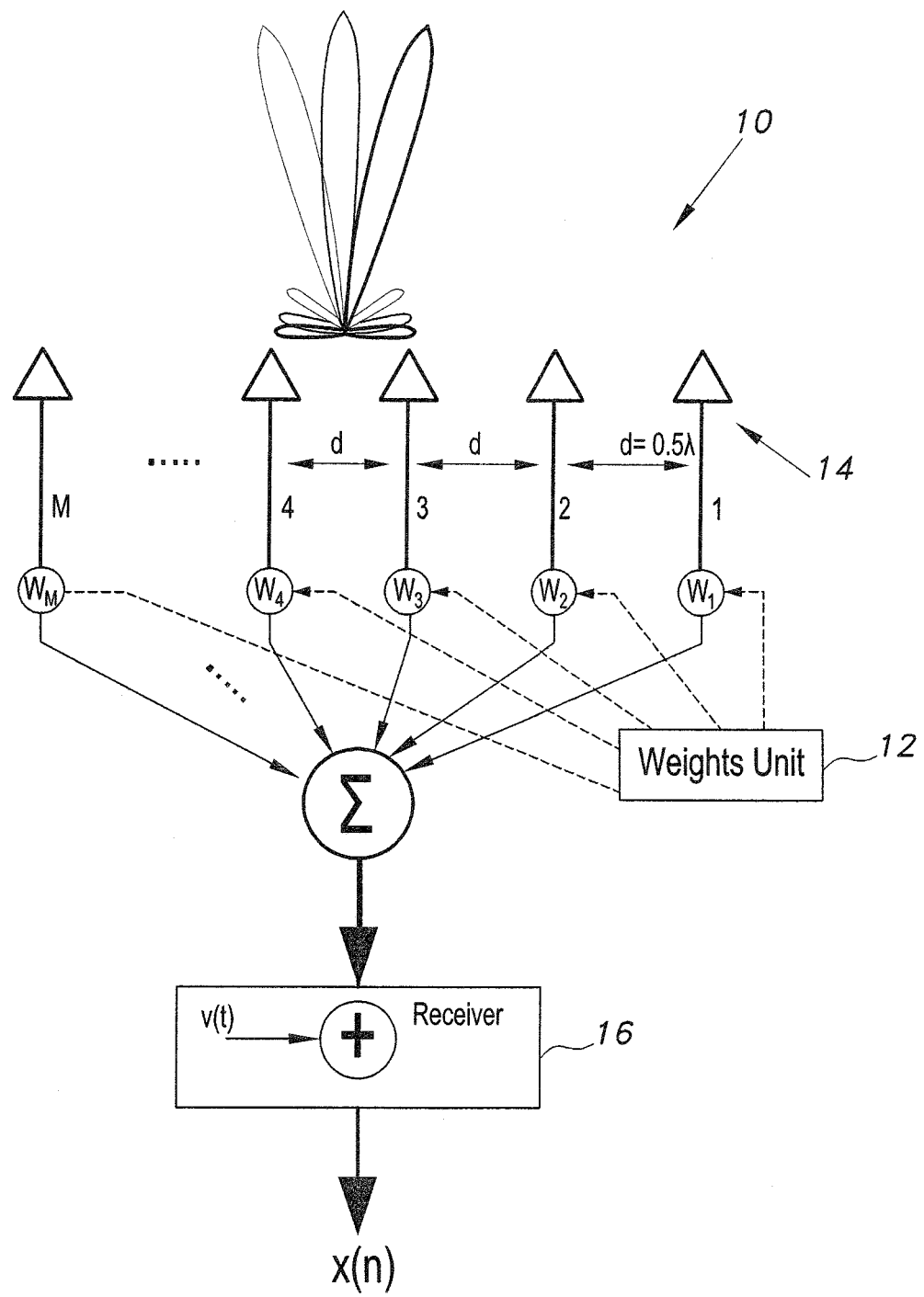
FIG. 1 schematically illustrates a method and apparatus for simple angle of arrival estimation according to the present invention.

Referring now to FIG. 1, a source transmits signal s(t) and the receiver is equipped with a switched beam system (SBS) which includes M antenna elements, which are separated by a fixed separation d and operate at frequency f. The antenna array has an array response vector (also referred to as a "steering vector") $a(\phi) \in \mathbb{C}^M$, where $\phi$ is the azimuth angle. The received signal x(t) is given by:

$$x_k(t) = \Sigma_M w_k s(t) + v(t), \quad (1)$$

where v(t) is the additive white Gaussian noise (AWGN), $w_k$ is the vector with dimensions M×1, which is the weight set applied across the antenna array elements such that the steering vector $a(\phi)$ is pointing to an azimuth angle $\phi_k$. The weights are updated to change the direction of the beam; i.e., $\phi_k$, to scan the angular space of interest, where $k \in [1:K]$, where K is the total number of generated beams. Based on the antenna array formation, whether it is linear, circular or planar, $a(\phi)$ changes accordingly:

$$w = \frac{1}{M} a(\phi). \quad (2)$$

The steering vector for the linear, circular and planar arrays can be estimated analytically. It should be noted that the present method is independent of the antenna array formation. The steering vector, in general, can be written as $a(\phi_k) = [w_{k1}, w_{k2}, \ldots, w_{kM}]$, where $w_{km}$ for $m \in [1:M]$ are the weights applied across the antenna array elements such that the steering vector $a(\phi)$ is pointing to an azimuth angle $\phi_k$. For a uniform linear array with uniform excitation, $a(\phi)$ can be expressed as:

$$a(\phi) = [1, e^{\beta d \cos \phi}, e^{\beta 2d \cos \phi}, \ldots, e^{\beta(M-1)d \cos \phi}], \quad (3)$$

where $$\beta = \frac{2\pi}{\lambda},$$

$\lambda$ is the wavelength of the signal s(t) received by the switched beam antenna array, and d is the separation distance between adjacent ones of the antenna elements. Here, $\phi$ ranges between $[0:\pi]$. For a uniform circular array (UCA), $$a(\phi) = [e^{\beta r \cos(\phi - \phi_1)}, e^{\beta r \cos(\phi - \phi_2)}, \ldots, e^{\beta r \cos(\phi - \phi_M)}], \quad (4)$$

where $$\phi_M = \frac{2\pi m}{M}, m = 1, 2, \ldots, M, \text{ and} \quad (5)$$

$\phi$ ranges between $[0:2\pi]$. Here, r is the radius of the antenna array. The elevation angle is assumed to be 90° in the 1-D angle of arrival estimation techniques. For a linear array with uniform excitation, the total number of orthogonal beams that can be generated is M. Using a non-uniform excitation, such as Dolph-Chebyshev or Taylor, it is possible to generate more orthogonal beams for the same number of antenna elements M. The digitized version of the received signal is then x(n) for $n=[1:N]$, where N is the total number of samples, also referred to as the "snapshots".

As will be described in greater detail below, for the example of a uniform linear array with uniform excitation, the overall method for simple angle of arrival estimation includes the following steps: (a) receiving an omnidirectional signal with a subset of antenna elements of a switched beam antenna array, where the switched beam antenna array has M total antenna elements, and during reception of the omnidirectional signal, a remainder of the antenna elements are switched off by RF switches; (b) dividing an angular space of interest into K beams; (c) setting an integer k equal to 1; (d) calculating a k-th steering vector, $a_k(\phi_k)$, which points to a k-th azimuth angle, $\phi_k$, for the switched beam antenna array as $a_k(\phi_k) = [1, e^{\beta d \cos \phi_k}, e^{\beta 2d \cos \phi_k}, \ldots, e^{\beta(M-1)d \cos \phi_k}]$, where $$\beta = \frac{2\pi}{\lambda}, \lambda$$

is a wavelength of a signal s(t) received by the switched beam antenna array, and d is a separation distance between adjacent ones of the antenna elements, and where the switched beam antenna array is a uniform linear antenna array; (e) calculating a k-th weight vector, $w_k$, where, for uniform excitation, the k-th weight vector is calculated as $w_k = a_k(\phi_k)$, and for non-uniform Dolph-Chebyshev excitation, the k-th weight vector is calculated as $w_k = a_c e^{j\psi_k}$, where $\psi_k = \beta d \cos \phi_k$ and $a_c$ are coefficients of dimensions 1×M of an inverse z-transform of an array factor, A(Z), where $A(Z) = Z^{-(M-1)/2} \Pi_{i=1}^{M-1} (Z - Z_i)$, where $Z_i = 2e^{j\phi_i}$ and $$\varphi_i = 2\cos^{-1}\left(\frac{y_i}{y_0}\right),$$

where $$y_i = \cos\left(\frac{(i-1/2)\pi}{M-1}\right)$$

for $i = 1, 2, \ldots, M-1$ and $$y_0 = \cosh\left(\frac{\cosh^{-1}(R)}{M-1}\right),$$

where R is a main lobe to side lobe ratio and j represents the imaginary number; (f) if k<K, then setting k=k+1 and returning to step (d); (g) feeding the set of weights $w_k$ for all $k = 1, \ldots, K$ to attenuators and phase shifters of the switched beam antenna array such that a main beam thereof is directed toward the k-th azimuth angle; (h) collecting a k-th received signal component, $x_k(n)$, from a direction of the k-th azimuth angle $\phi_k$ for a sample n of N total samples as $x_k(n) = \Sigma_M w_k s(n) + v(n)$, where v(n) is additive white Gaussian noise; (i) calculating a cross-correlation coefficient, $R_{k0}$, between an n-th sample of a reference signal, $x_0(n)$, and the k-th received signal component, $x_k(n)$, as $$R_{k0} = \frac{1}{N} \sum_{n=1}^{N} x_k(n) x_0^H(n),$$

where $x_0^H(n)$ is a Hermitian of the reference signal $x_0(n)$, the received omnidirectional signal being the reference signal; and (j) calculating an angle of arrival as an azimuth angle, $\phi_{k^*}$, where $k^* = \text{argmax}_k(R_{k0})$. As noted, the above is given for the example of a uniform linear array (ULA) with uniform excitation. It should be understood that the generalized method may be used with an arbitrary antenna array shape. For example, for a uniform circular array (UCA), the same method is applied, but, $a(\phi)=[e^{\beta r\ cos(\phi-\phi_1)}, e^{\beta r\ cos(\phi-\phi_2)}, \ldots, e^{\beta r\ cos(\phi-\phi_M)}]$, where $$\phi_M = \frac{2\pi m}{M}, m = 1, 2, \ldots, M,$$

and $\phi$ ranges between $[0:2\pi]$. Here, r is the radius of the antenna array.

As noted above, the AAS requires M receivers to downconvert the received signals from the M antenna elements to the baseband in order to estimate the AoA. The most popular AAS AoA techniques are the Bartlett, Capon and MUSIC techniques, as described above. In the Bartlett technique, the beam is formed across the angular region of interest by applying the weights that correspond to that direction, and whichever angle provides the highest power is the estimated AoA. The spatial power spectrum $P(\phi)$ for the Bartlett technique is given by:

$$P_{Bartlett}(\phi) = a^H(\phi)R_{xx}a(\phi), \qquad (7)$$

where H denotes the Hermitian operator, and $R_{xx}$ is the received signal auto covariance matrix with dimensions M×M. $R_{xx}$ is estimated as:

$$R_{xx} = \frac{1}{N}\sum_{n=1}^{N} x(n)x^H(n). \qquad (8)$$

The Bartlett technique suffers from a low resolution. Capon's technique attempts to overcome the Bartlett low resolution drawback by setting a constraint on the beam former gain to unity in that direction and minimizing the output power from signals coming from all other directions.

The spatial power spectrum for the Capon technique is given by:

$$P_{Capon}(\phi) = \frac{1}{a^H(\phi)R_{xx}^{-1}a(\phi)}. \qquad (9)$$

The MUSIC technique exploits the orthogonality of the signal and noise subspaces. After an eigenvalue decomposition (EVD) on $R_{xx}$ it can be written as:

$$R_{xx} = aR_{ss}a^H + \sigma^2 I, \qquad (10)$$

$$R_{xx} = U_s\Lambda_s U_s^H + U_v\Lambda_v U_v^H, \qquad (11)$$

where $\sigma^2$ is the noise variance, I is the unitary matrix, $U_s$ and $U_v$ are the signal and noise subspaces unitary matrices, and $\Lambda_s$ and $\Lambda_v$ are diagonal matrices of the eigenvalues of the signal and noise.

The spatial power spectrum for the MUSIC technique is given by:

$$P_{MUSIC}(\phi) = \frac{1}{a^H(\phi)P_v a(\phi)}, \qquad (12)$$

where $P_v = U_v U_v^H$.

Figure 2A:
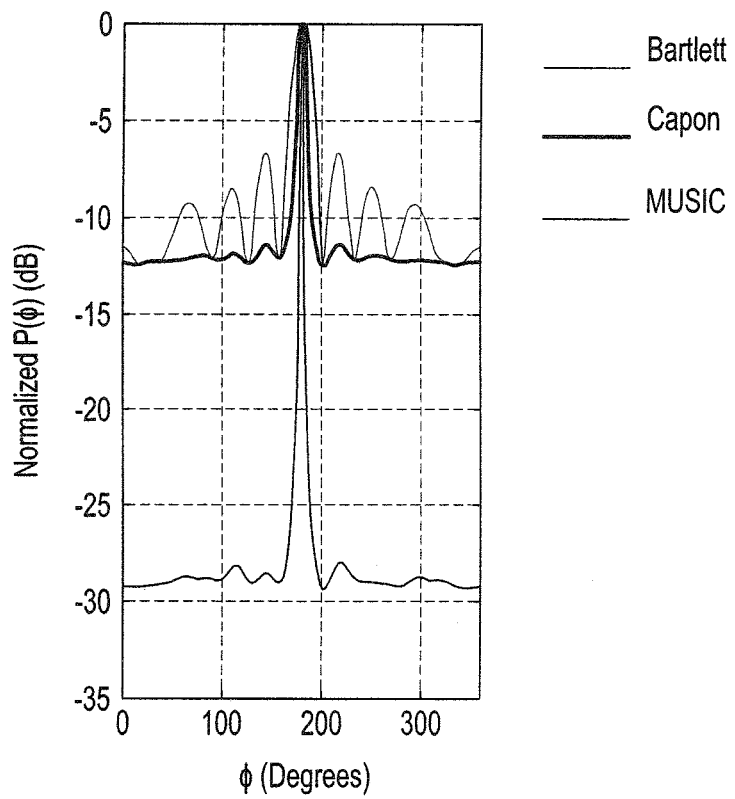
FIG. 2A is a graph comparing the prior art Bartlett, Capon and MUSIC angle of estimation techniques for a uniform circular array for a single source at $\phi=180°$, with M=16 antenna elements and N=1000 samples, with an SNR of 0 dB.
Figure 2B:
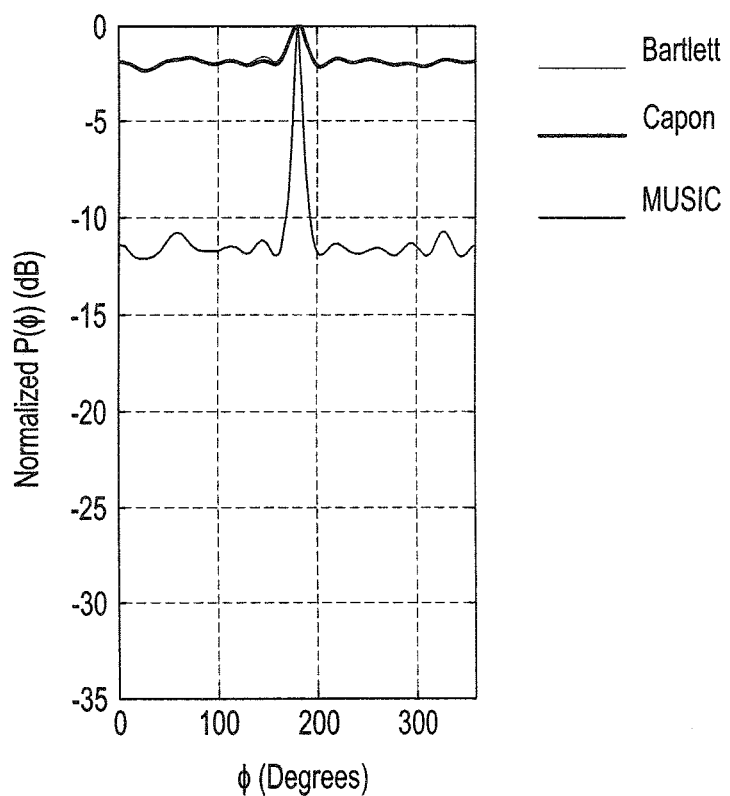
FIG. 2B is a graph comparing the prior art Bartlett, Capon and MUSIC angle of estimation techniques for a uniform circular array for a single source at $\phi=180°$, with M=16 antenna elements and N=1000 samples, with an SNR of −15 dB.

FIGS. 2A and 2B show the simulation results for the three prior art algorithms for a uniform circular array for a single source at $\phi=180°$, with M=16 antenna elements and N=1000 samples, with an SNR of 0 dB (FIG. 2A) and an SNR of −15 dB (FIG. 2B). It can be seen that the MUSIC technique outperforms the two other techniques, achieving a high peak to floor ratio (PFR) of the normalized spatial power of almost 28 dB for MUSIC, −13 for Capon, and −10 for Bartlett at SNR=0 dB. At low SNR, the Capon and Bartlett techniques almost fail to estimate the AoA, achieving a PFR of 2 dB, while the MUSIC technique achieves 12 dB. In other words, the MUSIC technique can operate at low SNR levels while the Bartlett and Capon techniques will fail to do so.

Figure 3A:
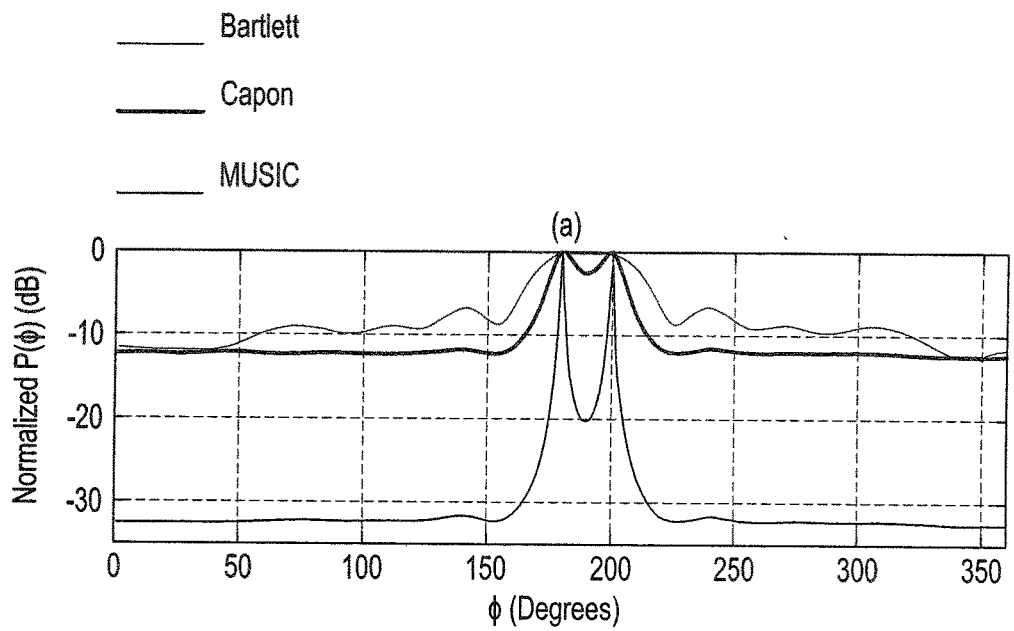
FIG. 3A is a graph comparing the prior art Bartlett, Capon and MUSIC angle of estimation techniques for two sources with M=16 antenna elements and N=1000 samples, and with $\phi_1=180°$ and $\phi_2=200°$.
Figure 3B:
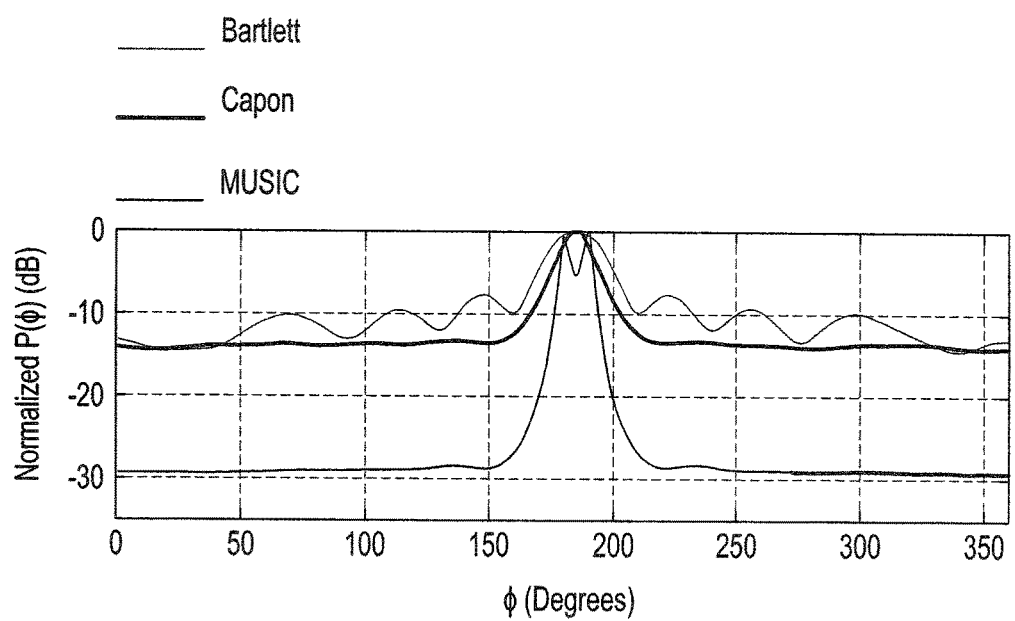
FIG. 3B is a graph comparing the prior art Bartlett, Capon and MUSIC angle of estimation techniques for two sources with M=16 antenna elements and N=1000 samples, and with $\phi_1=180°$ and $\phi_2=190°$.

FIGS. 3A and 3B show the simulation results comparing the prior art Bartlett, Capon and MUSIC angle of estimation techniques for two sources with M=16 antenna elements and N=1000 samples, and with $\phi_1=180°$. In FIG. 3A, $\phi_2=200°$ and in FIG. 3B, $\phi_2=190°$. Here, the normalized spatial power spectra are plotted for two sources with 20 degrees separation (FIG. 3A) and for 10 degrees separation (FIG. 3B). Again, the MUSIC technique outperforms the two other techniques, achieving a resolution of almost 10° with PFR=5 dB, whereas Capon achieved 20° with PFR=3 dB and Bartlett failed to resolve the two sources for a separation of less than 30°. The superiority of the MUSIC technique comes at the cost of requiring an extensive computational complexity and the number of sources must be known a priori or estimated. The estimation can be performed using techniques such as Akaike information criterion (AIC) and minimum description length (MDL), which add extra computational complexity burdens to the system. Additionally, the MUSIC technique requires that the sources must be uncorrelated.

The prior art AoA estimation techniques either have a low resolution problem or require extensive computational complexity to estimate the AoA. Moreover, they require M receivers to implement the AoA estimation technique, which increases the hardware complexity tremendously. Although the conventional SBSs have both low hardware and computational complexity, they fail to operate at medium and low level SNRs. This is mainly because the estimated AoA is the angle of the beam with the highest RSS. The present method, however, is a cross-correlation based SBS (XSBS) AoA estimation technique. The present XSBS benefits from the low hardware complexity of the conventional SBS, which requires a single receiver, yet does not sacrifice the resolution or performance at medium and low level SNRs. Moreover, the present XSBS requires minimal computational complexity to estimate the AoA since it is based on estimating the cross correlation between two collected one-dimensional vector of samples. With such low hardware and computational complexity, the present XSBS will consume less power which will be very beneficial, particularly, if implemented on a portable device. Furthermore, the present XSBS requires neither any prior information on the number of the sources nor that the sources be uncorrelated.

Returning now to FIG. 1, the present XSBS method begins in a first phase, Phase I, in which the Weights Unit 12 of the overall system 12 sends the first set of weights $w_0$. The Weights Unit controls the RF switches such that all antenna elements are switched off except selected antenna element branches. The set $w_0$ is applied on the antenna elements 14 such that the applied weight gain and phase on selected antenna elements result in a collective pattern close to omnidirectional pattern. Thus, the selected antenna elements operate as omnidirectional antennae or standalone antennae. At the same time, the weights are applied at the antenna elements in between the selected antenna elements to minimize their contribution to the summed signal to zero. The number of selected antennas, $M_0$, as well as the separation between them, depends on the antenna array formation. The objective is to include as many antennae as possible, but not collecting correlated signals. Assuming an approximate omni-directional pattern for individual antenna elements, XSBS then acquires approximately omni-directional N samples to collect the reference signal $x_0$.

In the next phase, Phase II, the omni-directional signal collected in the first phase; i.e., $x_0$, becomes the reference signal. The Weights Unit 12 sends the sets of weights $w_k$, for $k \in [1:K]$. The set $w_k$ steers the main beam of the antenna array to the direction $\phi_k$, a method referred to as sequential sweeping. The XSBS then acquires N samples to collect the signal $x_k$. In the next step, a cross correlation operation is applied between the reference signal $x_0$ and the $k^{th}$ beam signal $x_k$. The cross correlation operation is a relatively simple operation, thus the computational complexity of the XSBS technique is still low.

As noted above, the present method is not exclusive to a particular antenna array formation. Rather, it can operate with any formation, such as linear, circular, planar or any other antenna array formation where the steering vector of the antenna can be estimated either analytically or experimentally. An adequate separation between the antenna elements is needed to minimize the spatial correlation between the signal collected from each of them. Since the antenna elements are already placed $0.5\lambda$ apart, a limited number of antenna elements can be used as omni-directional diversity antennas. As $M_0$ increases, the XSBS can estimate signal with lower SNR values.

Additionally, the total number of antenna elements in the array is a key factor in determining the resolution of the XSBS. The higher the number of antenna elements, the smaller the half power beam width (HPBW) of the antenna array beam. A smaller HPBW leads to a better resolution. On the other hand, a higher number of antenna elements will increase the hardware complexity of the XSBS since they will require more components to apply the weights. Using a non-uniform excitation, such as Dolph-Chebyshev excitation, it is possible to generate more orthogonal beams for the same M.

For ULA, the array response vector $a(\phi)$ is defined by the Chebyshev polynomial of degree M−1, $T_{M-1}(y)$, in the scaled variable y as $a(\phi)=T_{M-1}(y)$ and $$y = y_0 \cos\left(\frac{\beta d \cos\phi}{2}\right).$$

The weights generated based on the Dolph-Chebyshev polynomials are given by:

$$w_k(\phi) = W_{M-1}(y), \quad (13)$$

where $y = y_0 \cos(0.5\phi)$. $y_0$ is estimated as:

$$y_0 = \cosh\left(\frac{\cosh^{-1}(R)}{M-1}\right), \quad (14)$$

where R is a main lobe to side lobe ratio. Additionally, $$W_{M-1}(y) = \cos((M-1)\cos^{-1} y). \quad (15)$$

The elements of the weight vector $a(\phi_k)$ for a fixed k and $m \in [1:M]$ can be calculated by creating the z-transform of the array response factor from its zeros and then applying an inverse z-transform. The M−1 zeros of $T_{M-1}(y)$ are $$y_i = \cos\left(\frac{(i-1/2)\pi}{M-1}\right)$$

for i=1, 2, ..., M−1. Letting $\psi = \beta d \cos\phi$, the pattern zeros are $$\psi_i = 2\cos^{-1}\left(\frac{y_i}{y_0}\right),$$

where $Z_i = 2e^{j\psi_i}$, where j represents the imaginary number. The z-transform of the array factor, A(Z), is then $A(Z) = Z^{-(M-1)/2} \prod_{i=1}^{M-1}(Z - Z_i)$. $a_c$ are coefficients of dimensions 1×M of an inverse z-transform of the array factor, A(Z), and form the weight vector $w_k = a_c e^{j\psi_k} = a_k(\phi_k)$, which is steered towards $\phi_k$ to generate $a_k(\phi_k)$ by $\psi_k = \beta d \cos\phi_k$, resulting in $a(\phi_k) = a_c e^{j*\psi_k}$.

Figure 4:
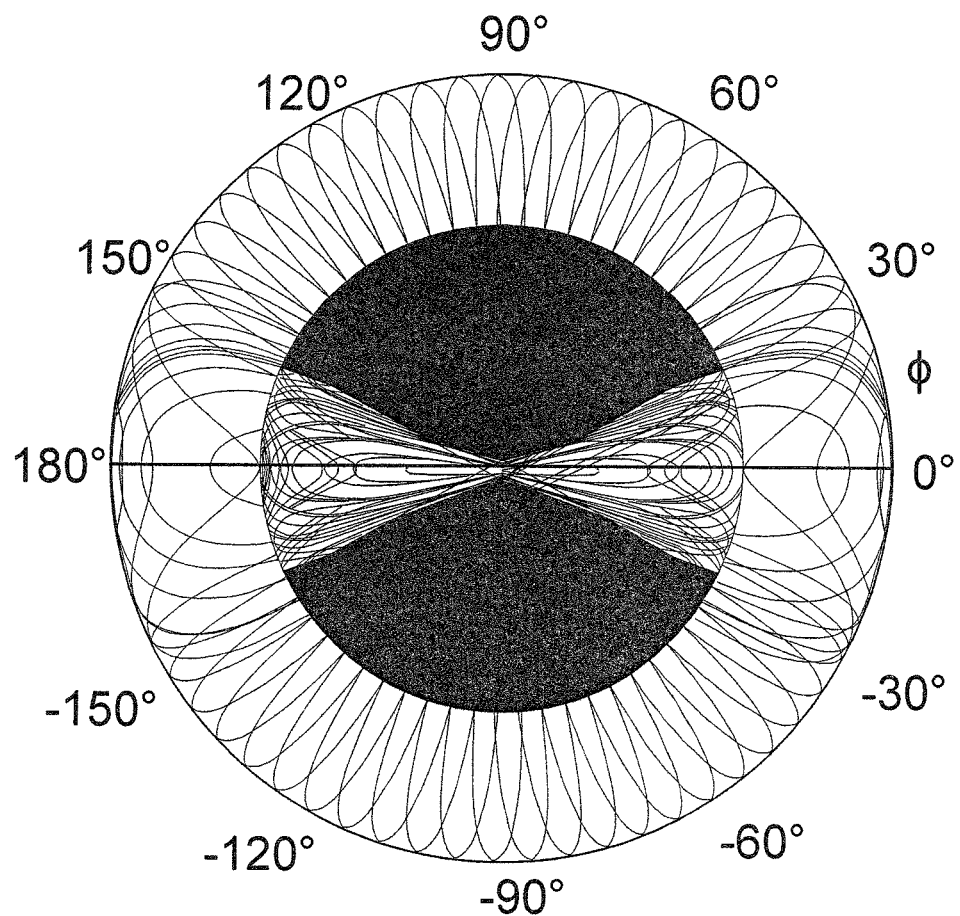
FIG. 4 is a plot illustrating the resolution of the method and apparatus for simple angle of arrival estimation for a steered antenna array beam with M=17 antenna elements, an antenna element separation of $d=0.5 \lambda$, and a main lobe to side lobe ratio of R=15 dB, with Dolph-Chebyshev non-uniform excitation.

To study the resolution of the XSBS, the steered antenna array beam is plotted in FIG. 4 for M=17, separation d=0.5λ, and R=15 dB, with Dolph-Chebyshev non-uniform excitation. The achieved HPBW is approximately 6° with a total of K=32 orthogonal beams scanning 180°. As M increases, the resolution of the XSBS improves since the HPBW decreases.

After the completion of the first phase of the XSBS is completed by collecting an omni-directional signal, the XSBS moves to the second phase of estimating the AoA. In this phase, the omni-directional signal, $x_0$, collected earlier, now becomes the XSBS reference signal. The XSBS then starts to scan the angular region of interest and collect the signals $x_k$, for $k \in [1:K]$ (indicated at 16 in FIG. 1):

$$x_k(n) = \Sigma_M w_k s(n) + v(n). \quad (16)$$

The Weights Unit 12 sends the precalculated weight sets, $w_k$, to the antenna array 14 such that the main beam is directed towards the $k^{th}$ angle. The cross correlation coefficient between the reference signal and the $k^{th}$ signal can be given by:

$$R_{k0} = \frac{1}{N}\sum_{n=1}^{N} x_k(n) x_0^H(n), \quad (17)$$

where $x_0^H(n)$ is a Hermitian of the reference signal $x_0(n)$, the received omnidirectional signal being the reference signal. It should be noted that equation (17) is applied on two vectors, each having a dimension of 1×N, while the autocovariance function in equation (8) is applied on a matrix with a dimension M×N. For the MUSIC technique, an eigendecomposition operation is then applied on this autocovariance function along with the other steps described above to estimate the AoA. For the XSBS, equation (17) is all the computation needed to estimate the AoA, which reduces the computational complexity tremendously.

Figure 5:
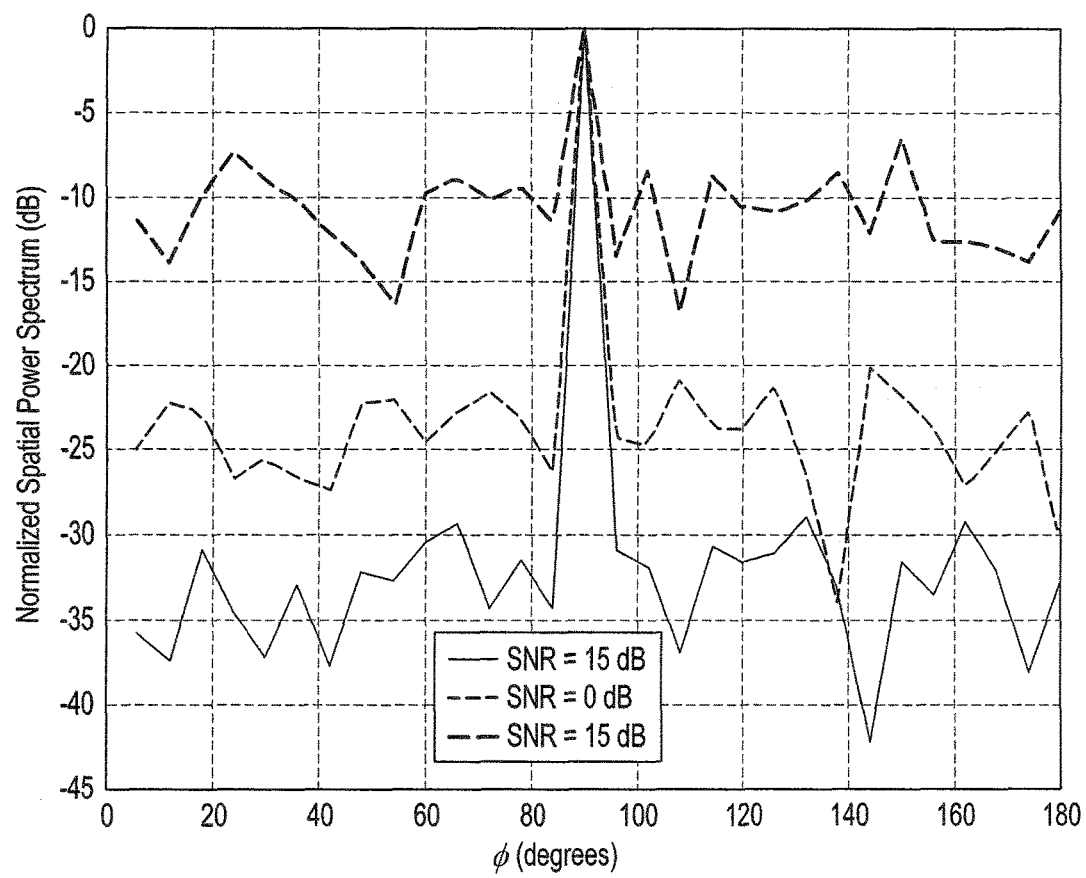
FIG. 5 is a plot of the normalized cross correlation coefficient for the method and apparatus for simple angle of arrival estimation using a simulated linear antenna array with Dolph-Chebyshev excitation, and with M=17 antenna elements, $M_0=1$ diversity antennae, and N=1000 samples for a signal arriving at $\phi_k=90°$ at varying SNR levels.

In FIG. 5, the XSBS technique is simulated with a linear antenna array with Dolph-Chebyshev excitation with M=17, $M_0$=1 diversity antennae, and N=1000 for a signal arriving at $\phi_k$=90° at varying SNR levels. FIG. 5 plots the normalized cross correlation coefficient calculated by equation (17), which is now the spatial power, versus the azimuth angle $\phi$. It can be seen that the XSBS has a superb performance, achieving a PFR=35 dB at SNR=15 dB, a PFR=25 dB at SNR=0 dB, and a PFR=13 at SNR=−15 dB.

Figure 6:
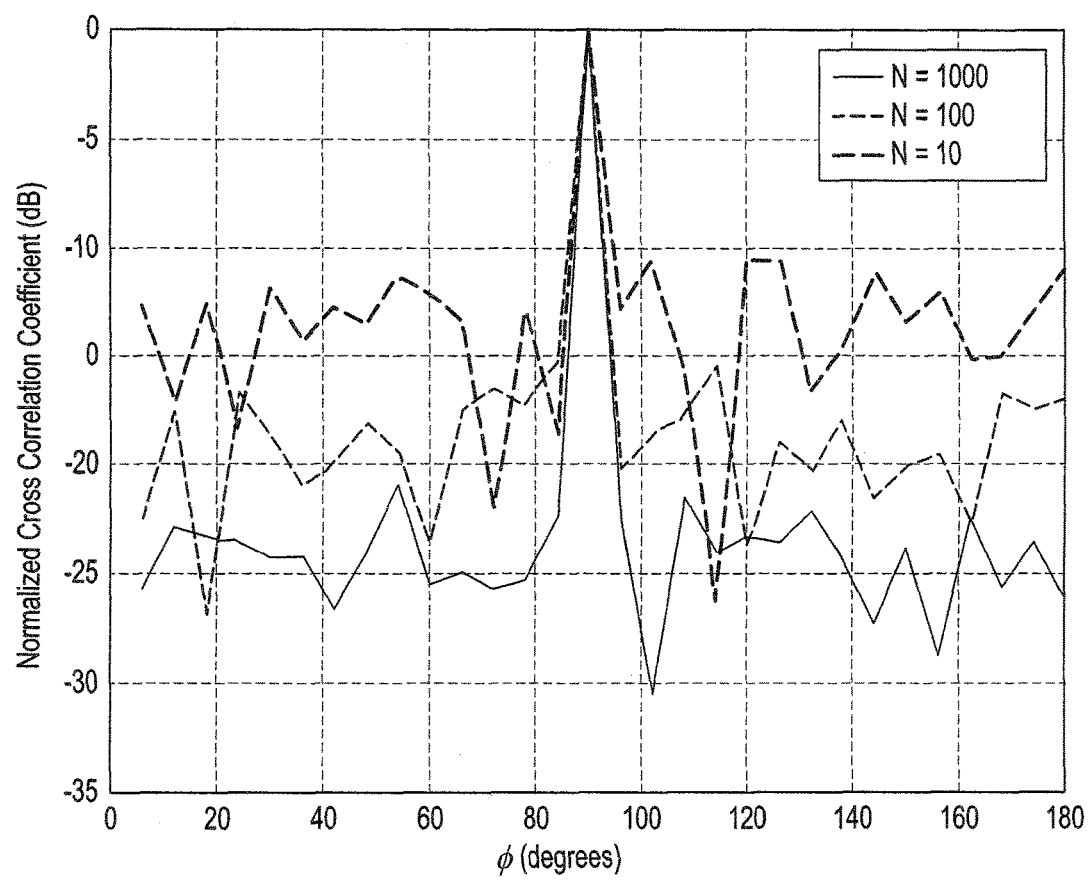
FIG. 6 is a plot of the normalized cross correlation coefficient for the method and apparatus for simple angle of arrival estimation using a simulated linear antenna array with Dolph-Chebyshev excitation, and with M=17 antenna elements, $M_0=1$ diversity antennae, for a signal arriving at $\phi_k=90°$ with SNR=0 dB, for varying samples of N=10, 100, and 1000.

FIG. 6 is a plot of the normalized cross correlation coefficient for the present method using a simulated linear antenna array with Dolph-Chebyshev excitation, and with $M=17$ antenna elements, $M_0=1$ diversity antennae, for a signal arriving at $\phi_k=90°$ with SNR=0 dB, for and varying samples of N=10, 100, and 1000. As expected, as the number of samples increases, the performance of the XSBS method improves. From FIGS. 5 and 6, it can be inferred that at higher SNR values, a lower number of samples is required to achieve an adequate PFR.

The MUSIC algorithm requires that the number of sources be known a priori. The maximum number of sources for the MUSIC algorithm is limited by the number of antenna elements M. In other words, the MUSIC algorithm cannot estimate the AoA if the number of sources is greater than M. Additionally, the MUSIC algorithm requires that the signals from different sources must be uncorrelated. The present method, however, is limited by the total number of beams K, which is much larger than M. Further, the present method does not require any prior information about the number of sources. Moreover, the present method does not require that the signals from different sources be uncorrelated.

FIGS. 7A-7C compare the normalized spatial power spectrum of the present method for simple angle of arrival estimation against the prior art MUSIC technique for SNR=−20 dB (FIG. 7A), SNR=−15 dB (FIG. 7B), and SNR=−10 dB (FIG. 7C). In each, N=1000 samples. The MUSIC technique is applied to a uniform linear array with $M=16$, and the present inventive method is applied to a uniform linear array with $M=17$ with Dolph-Chebyshev excitation. It can be seen that XSBS has a better PFR than MUSIC at very low SNR values and comparable performance at medium and low SNR levels.

Figure 8A:
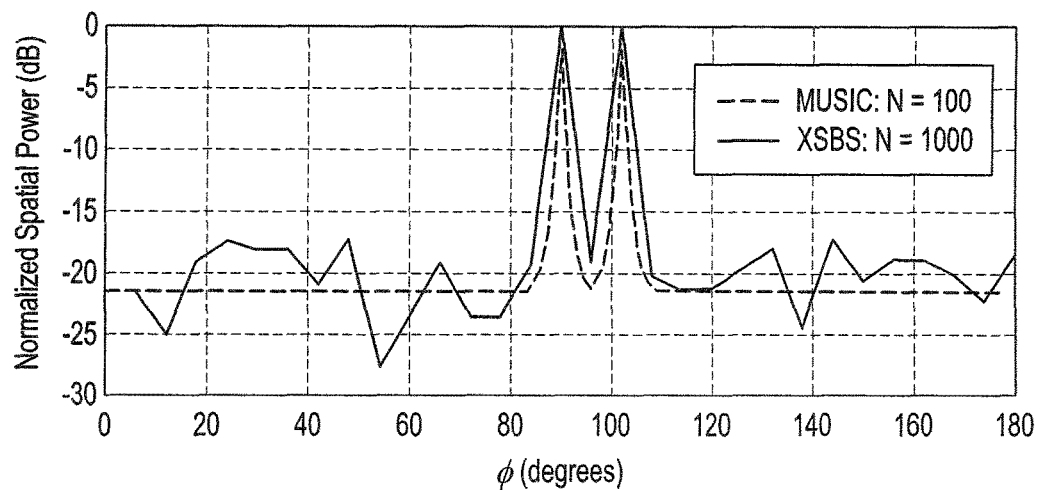
FIG. 8A is a graph comparing the normalized spatial power spectrum of the method for simple angle of arrival estimation against the prior art MUSIC technique for two sources with SNR=0 dB.
Figure 8B:
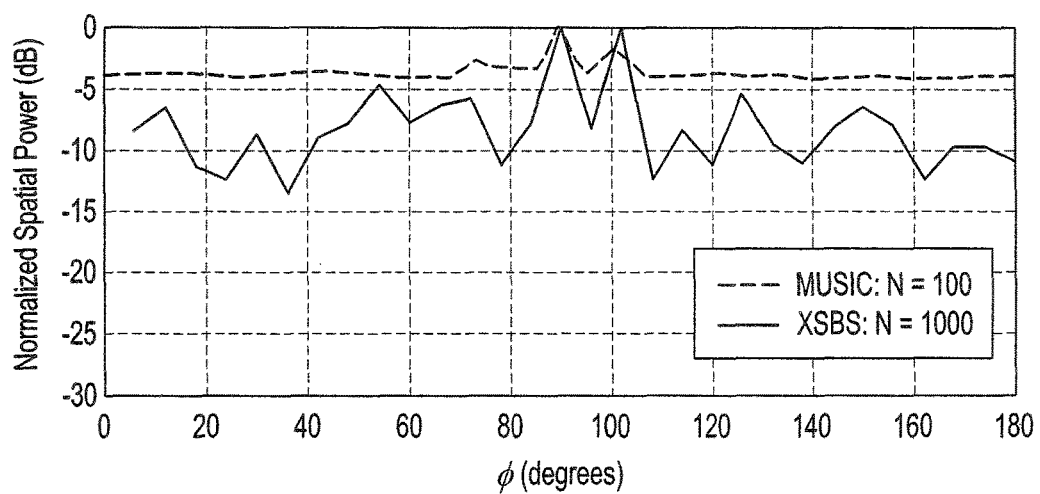
FIG. 8B is a graph comparing the normalized spatial power spectrum of the method for simple angle of arrival estimation against the prior art MUSIC technique for two sources with SNR=−15 dB.

FIGS. 8A and 8B are graphs comparing the normalized spatial power spectrum of the method for simple angle of arrival estimation against the prior art MUSIC technique for two sources with SNR=0 dB (FIG. 8A) and SNR=−15 dB (FIG. 8B). Here, the two sources arrive at angles $\phi_1=90°$ and $\phi_2=102°$. It can be seen that the resolution of the MUSIC technique is highly dependent on the received SNR, whereas the present method is dependent on the HPBW of the main lobe.

Figure 12:
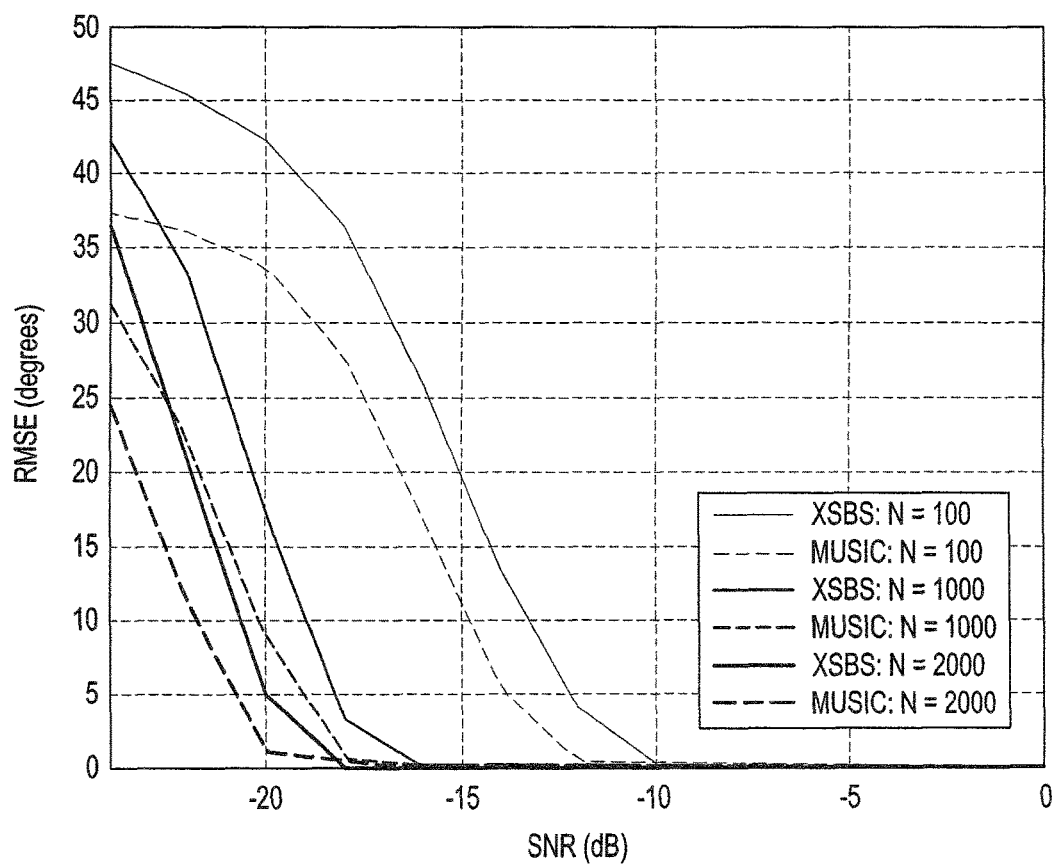
FIG. 12 is a graph comparing the root mean square error (RMSE) of the present method for simple angle of arrival estimation with the prior art MUSIC technique.

FIG. 12 is a graph comparing the root mean square error (RMSE) of the present method for simple angle of arrival estimation with the prior art MUSIC technique over varying SNR. For simulations using $M=16$, it can be seen that the present inventive XSBS method has a very comparable performance to the MUSIC technique by achieving a comparable RMSE.

Figure 9:
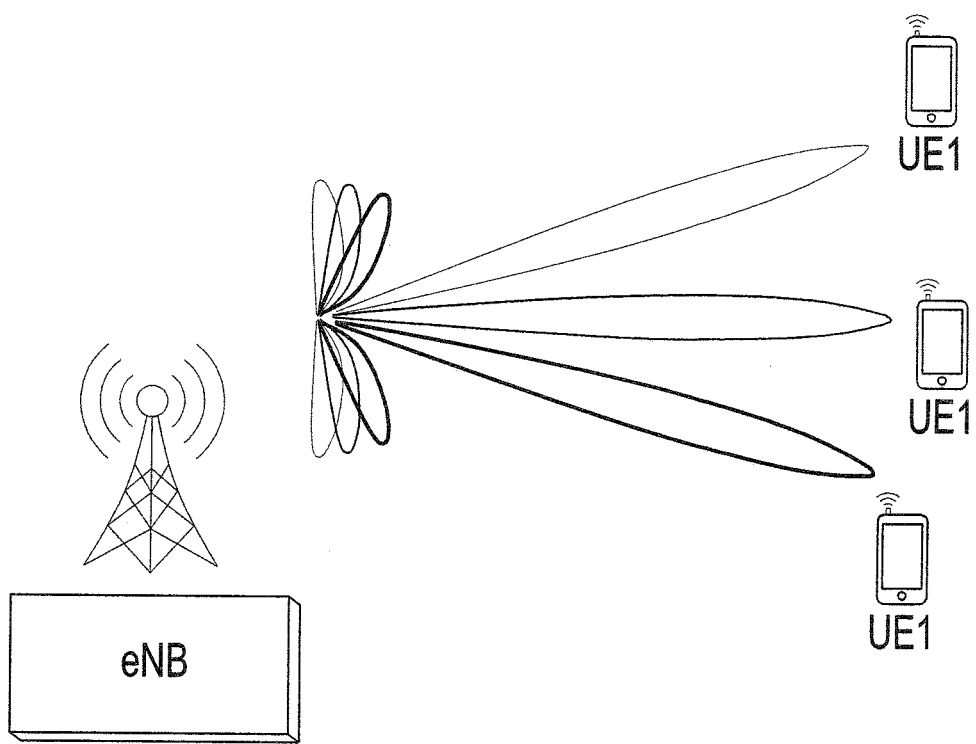
FIG. 9 diagrammatically illustrates a long-term evolution (LTE) system in which the present method for simple angle of arrival estimation may be applied for beamforming FIG. 10 diagrammatically illustrates an alternative long-term evolution (LTE) system in which the present method for simple angle of arrival estimation may be applied for interference cancellation.

The present system and method may be used for beamforming for cell capacity improvement, for example. FIG. 9 illustrates the concept of including beamforming in a long term evolution (LTE) system to improve its cell capacity. As shown in FIG. 9, three user equipments (UEs), i.e., users, are communicating with the eNodeB (eNB); i.e., the base station. In order to increase the capacity of the cell, the eNB forms three beams directed to the three UEs. An AoA estimation unit is needed prior to forming the beam towards the UEs in order to find out the directions at which the beams will be directed.

Figure 10:
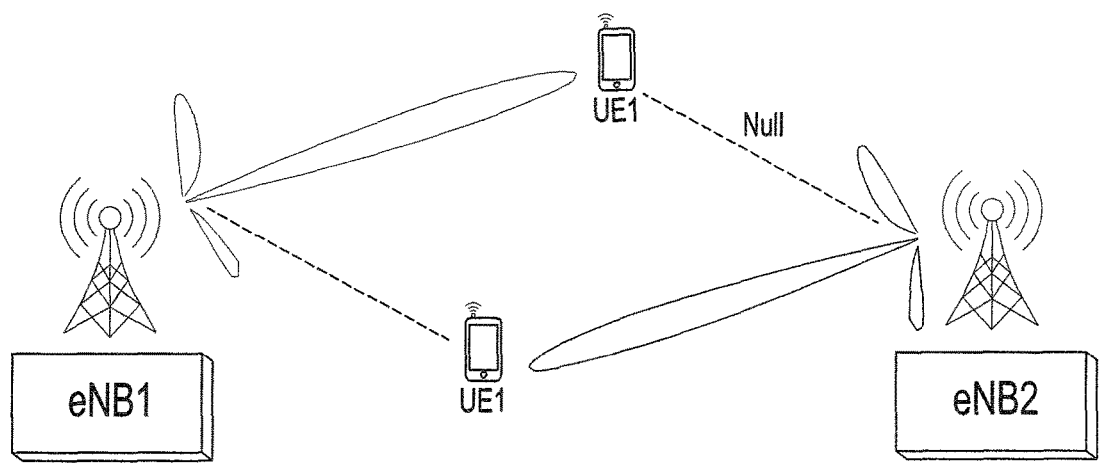

Another exemplary application for the present estimation unit is interference cancellation, as illustrated below in FIG. 10. As shown, eNB1 is in communication with UE1, while placing a null towards UE2, which is communicating with eNB2. In a similar way, eNB2 is communicating with UE2, while placing a null towards UE1. By doing so, the signal from eNB1 is received by UE1, while the signal from eNB2 is not interfered with by eNB1's signal. In order to be able to do so, both eNB1 and eNB2 estimate the AoA of UE1 and UE2 in order to be able to form their beams towards the desired user and a null towards the unwanted user. Although similar to the situation shown in the previous example, the difference is that the estimated AoAs fed to the transmitter are used to direct the beam towards the desired user and a null towards the undesired user. It should be noted that a similar application is anti-jamming, where a null is placed in the direction of the jammer. This application is of particular interest to the military for battlefield use.

Tracking is a further exemplary application of the present AoA estimation unit and method, such as in non-GPS tracking of moving sources. These sources could be UEs, such as mobile devices or moving objects (sources), such as those used in automatic camera tracking applications. There are several objectives of tracking mobile devices, including localization, security and beamforming. For a mobile UE, the eNB needs to track the UE in order to be able to direct its beam towards it such that the received signal by the UE is higher in power, which increases the throughput. This requires the eNB to continuously estimate the AoA of the mobile device. On the other hand, the objective of automatic camera tracking is to track moving objects, such as automobiles or animals which have a transmitter (i.e., a source) connected to them. This requires the automatic camera tracking system to estimate the AoA of the moving source in order to steer the camera towards it.

For the prior art MUSIC technique, there are three major computational steps needed to estimate the AoA. The first step is the autocovariance function, which requires multiplication of two matrices with sizes M×N and N×M. The exact number of floating-point operations (i.e., flops) needed for this matrix multiplication is $M^2(2N-1)$. The complexity of the first step is $\mathcal{O}(M^2N)$. The second step is the EVD operation, which has a complexity of $\mathcal{O}(M^3)$. The third step is obtaining the spatial pseudo-spectrum, which has a complexity of $\mathcal{O}(JM)$, where J is the number of spectral points of the total angular field of view. Therefore, the exact complexity of MUSIC is given by $\mathcal{O}(M^2N+M^2P)$, where P is the number of potential AoAs. The EVD may be simplified using the fast decomposition technique, which reduces the complexity of MUSIC to $\mathcal{O}(M^2P+M(M-P)J+(M-P)J)$.

In contrast, the present XSBS method requires only vector multiplication of two vectors, each having dimensions of 1×N. The vector multiplication in for each $k \in [1:k]$ requires only N multiplications and N−1 additions. Thus, for K beams, the exact number of flops is $k(2N-1)$. Therefore, the complexity of XSBS is $\mathcal{O}(KN)$. For non-uniform excitation, $K \approx 2M$, which reduces the complexity to $\mathcal{O}(MN)$. Consequently, the computational complexity of XSBS is considerably less than the complexity needed in just the first step of MUSIC.

It should be noted that in Phase II, described above, binary sweeping can be used to scan the angular region of interest. In other words, the angular region of interest can be divided into two equal regions. The cross-correlation coefficient can be estimated for the two signals collected from the two regions. The half with the higher cross correlation coefficient can then be divided into two equal halves and so on. To do so, the Weights Unit adjusts the weights accordingly. A subset of the antenna array can be used to achieve this target since a lower number of antenna array elements leads to higher half power beam width. The rest of the antenna array elements will be switched off using the RF switches. The first benefit of binary sweeping is that it reduces the number of cross correlation estimation from K to $\log_2 K$. The second benefit is that it significantly increases the main lobe to side lobe ratio (R) such that almost no signal is leaked through a side lobe. The HPBW is initially high and decreases as the target is approached. With the high required HPBW, the main lobe to side lobe ratio can be very high.

Figure 11:
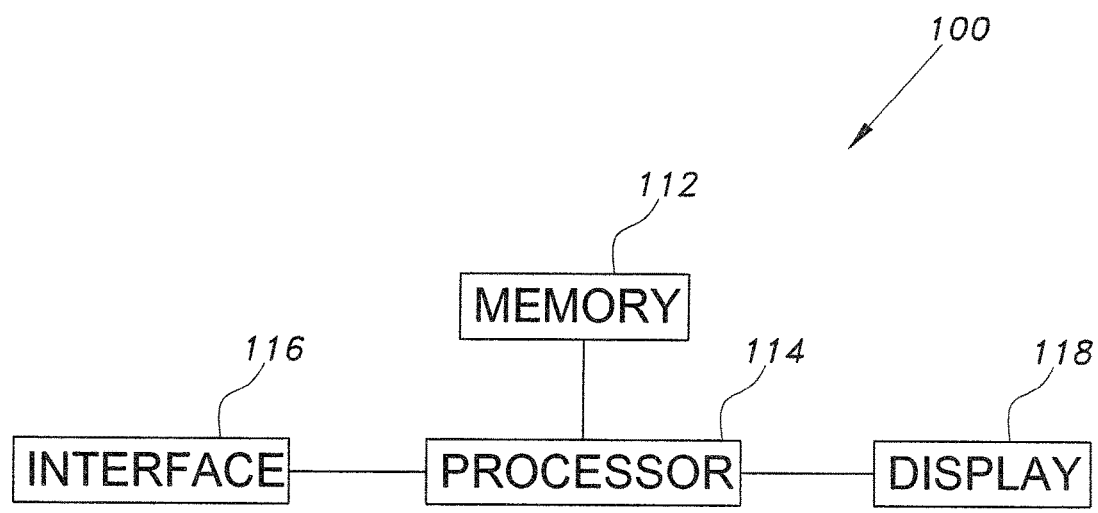
FIG. 11 is a block diagram illustrating system components of the apparatus for simple angle of arrival estimation.

It should be understood that the calculations may be performed by any suitable computer system, such as that diagrammatically shown in FIG. 11. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the present invention is not limited to the embodiments described above, but encompasses any and all embodiments within the scope of the following claims.

We claim:

1. A method of estimating angle of arrival of a received signal, comprising the steps of:
   (a) receiving an omnidirectional signal with a subset of antenna elements of a switched beam antenna array, the switched beam antenna array having M total antenna elements, wherein during reception of the omnidirectional signal, a remainder of the antenna elements are switched off by RF switches;
   (b) dividing an angular space of interest into K beams;
   (c) setting an integer k equal to 1;
   (d) calculating a k-th steering vector, $a_k(\phi_k)$, which points to a k-th azimuth angle, $\phi_k$, for the switched beam antenna array as $a_k(\phi_k)=[1, e^{\beta d \cos \phi_k}, e^{\beta 2d \cos \phi_k}, \ldots, e^{\beta(m-1)d \cos \phi_k}]$, wherein $$\beta = \frac{2\pi}{\lambda},$$

where $\lambda$ is a wavelength of a signal s(t) received by the switched beam antenna array, and d being a separation distance between adjacent ones of the antenna elements, the switched beam antenna array being a uniform linear antenna array;
   (e) calculating a k-th weight vector, $w_k$, wherein, for uniform excitation, the k-th weight vector is calculated as $w_k=a_k(\phi_k)$, and for non-uniform Dolph-Chebyshev excitation, the k-th weight vector is calculated as $w_k=a_c e^{j\psi_k}$, where $\psi_k=\beta d \cos \phi_k$ and $a_c$, are coefficients of dimensions 1×M of an inverse z-transform of an array factor, A (Z), where $A(Z)=Z^{-(M-1)/2}\Pi_{i=1}^{M-1}(Z-Z_i)$, where $Z_i=2e^{j\varphi_i}$ and $$\varphi_i = 2\cos^{-1}\left(\frac{y_i}{y_0}\right),$$

where $$y_i = \cos\left(\frac{(i-1/2)\pi}{M-1}\right)$$

for i=1, 2, . . . M−1 and $$y_0 = \cosh\left(\frac{\cosh^{-1}(R)}{M-1}\right),$$

where R is a main lobe to side lobe ratio and j represents the imaginary number;
   (f) if k<K, then setting k=k+1 and returning to step (d);
   (g) feeding the set of weights $w_k$ for all k=1, . . . , K to attenuators and phase shifters of the switched beam antenna array such that a main beam thereof is directed toward the k-th azimuth angle;
   (h) collecting a k-th received signal component, $x_k(n)$, from a direction of the k-th azimuth angle $\phi_k$ for a sample n of N total samples as $x_k(n)=\Sigma_M w_k x(n)+v(n)$, where v(n) is additive white Gaussian noise;
   (i) calculating a cross-correlation coefficient, $R_{k0}$, between an n-th sample of a reference signal, $x_0(n)$, and the k-th received signal component, $x_k(n)$, as $$R_{k0} = \frac{1}{N}\sum_{n=1}^{N} x_k(n)x_0^H(n),$$

where $x_0^H(n)$ is a Hermitian of the reference signal $x_0(n)$, the received omnidirectional signal being the reference signal; and
   (j) calculating an angle of arrival as an azimuth angle, $\phi_{k^*}$, where $k^*=\text{argmax}_k(R_{k0})$.

2. The method of estimating angle of arrival of a received signal as recited in claim 1, wherein the angular space of interest is divided into a first set of two equal regions, the cross-correlation coefficient $R_{k0}$ is calculated for two signals from the two regions, and the region having the higher cross-correlation coefficient $R_{k0}$ is divided into a second set of two equal regions.

3. An apparatus of estimating angle of arrival of a received signal, comprising:
   a switched beam antenna array having M total antenna elements, the switched beam antenna array receiving an omnidirectional signal with a subset of the antenna elements, an angular space of interest being divided into K beams;

a plurality of RF switches in communication with the switched beam antenna array, wherein during reception of the omnidirectional signal, a remainder of the antenna elements are switched off by the RF switches;

means for calculating a k-th steering vector, $a_k(\phi_k)$, which points to a k-th azimuth angle, $\phi_k$, for the switched beam antenna array as $a_k(\phi_k)=[1, e^{\beta d \cos \phi_k}, e^{\beta 2d \cos \phi_k}, \ldots, e^{\beta(m-1)d \cos \phi_k}]$, wherein $$\beta = \frac{2\pi}{\lambda},$$

where $\lambda$ is a wavelength of a signal s(t) received by the switched beam antenna array, and d being a separation distance between adjacent ones of the antenna elements, the switched beam antenna array being a uniform linear antenna array, k being an integer ranging between 1 and K;

means for calculating a k-th weight vector, $w_k$, wherein, for uniform excitation, the k-th weight vector is calculated as [[$W_k = a_c e^{j\psi_k}$]] $w_k = a_k(\phi_k)$ and for non-uniform Dolph-Chebyshev excitation, the k-th weight vector is calculated as $w_k = a_c e^{j\psi_k}$, where $\psi_k = \beta d \cos \phi_k$ and $a_c$ are coefficients of dimensions 1×M of an inverse z-transform of an array factor, A(Z), where $A(Z) = Z^{-(M-1)/2} \Pi_{i=1}^{M-1}(Z-Z_i)$, where $Z_i = 2e^{j\varphi_i}$ and $$\varphi_i = 2\cos^{-1}\left(\frac{y_i}{y_0}\right),$$

where $$y_i = \cos\left(\frac{(i-1/2)\pi}{M-1}\right)$$

where for i=1, 2, ..., M−1 and $$y_0 = \cosh\left(\frac{\cosh^{-1}(R)}{M-1}\right),$$

where R is a main lobe to side lobe ratio and j represents the imaginary number;

means for feeding the set of weights $w_k$ for all k= 1, ..., K to attenuators and phase shifters of the switched beam antenna array such that a main beam thereof is directed toward the k-th azimuth angle;

means for collecting a k-th received signal component, $x_k(n)$, from a direction of the k-th azimuth angle $\phi_k$ for a sample n of N total samples as $x_k(n)=\Sigma_M w_k x(n)+v(n)$, where v(n) is additive white Gaussian noise;

means for calculating a cross-correlation coefficient, $R_{k0}$, between an n-th sample of a reference signal, $x_0(n)$, and the k-th received signal component, $x_k(n)$, as $$R_{k0} = \frac{1}{N}\sum_{n=1}^{N} x_k(n) x_0^H(n),$$

where $x_0^H(n)$ is a Hermitian of the reference signal $x_0(n)$, the received omnidirectional signal being the reference signal; and means for calculating an angle of arrival as an azimuth angle, $\phi_{k*}$, where $k^* = \text{argmax}_k(R_{k0})$.

* * * * *